United States Patent
Bell et al.

(10) Patent No.: US 9,469,457 B2
(45) Date of Patent: *Oct. 18, 2016

(54) SYSTEM AND METHODS FOR TRANSPORTING OR STORING OXIDATIVELY-DEGRADABLE FOODSTUFF

(71) Applicant: Global Fresh Foods, San Francisco, CA (US)

(72) Inventors: Laurence D. Bell, Pacific Grove, CA (US); David G. Schanzer, Monterey, CA (US); Brian J. Westcott, Menlo Park, CA (US)

(73) Assignee: GLOBAL FRESH FOODS, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,848

(22) Filed: Aug. 2, 2013

(65) Prior Publication Data

US 2013/0313135 A1    Nov. 28, 2013

Related U.S. Application Data

(60) Continuation of application No. 13/462,692, filed on May 2, 2012, now Pat. No. 8,512,780, which is a division of application No. 11/769,944, filed on Jun. 28, 2007, now Pat. No. 8,187,653.

(60) Provisional application No. 60/818,269, filed on Jun. 30, 2006, provisional application No. 60/871,566, filed on Dec. 22, 2006.

(51) Int. Cl.
*B65D 81/18* (2006.01)
*A23B 4/16* (2006.01)
(Continued)

(52) U.S. Cl.
CPC ............... *B65D 81/18* (2013.01); *A23B 4/16* (2013.01); *A23L 3/3418* (2013.01); *H01M 8/00* (2013.01);
(Continued)

(58) Field of Classification Search
CPC . A23L 3/3418; A23L 3/3445; A23L 3/3409; A23L 3/3436; A23L 3/36; H01M 2008/1095; H01M 2250/00; A23B 4/16; A23B 7/148; B65D 2588/746; B65D 88/745; F25D 17/042
USPC ........ 426/107, 118, 129, 314–316, 231, 232, 426/234, 236, 395, 410, 418–419; 429/8, 429/410, 429, 444, 515
See application file for complete search history.

(56) References Cited

U.S. PATENT DOCUMENTS 3,415,310 A    12/1968 Kuhlmann
3,419,400 A    12/1968 Hayhurst et al.
(Continued)

FOREIGN PATENT DOCUMENTS

AU    2007269285    10/2013
DE    4430617 A1    2/1996
(Continued)

OTHER PUBLICATIONS

Asou et al. [JP 09201182 A] Machine Translation, Accessed from JPO AIPN on May 9, 2014.*
(Continued)

*Primary Examiner* — Steven Leff
(74) *Attorney, Agent, or Firm* — The Marbury Law Group PLLC

(57) ABSTRACT

Disclosed are packaging systems and method useful in extending the storage-life of foodstuff such as fresh fish. The packaging systems and methods can be used to transport or store the foodstuff for an extended period of time. The packaging systems preferably use a fuel cell to maintain a reduced oxygen level in the environment surrounding the foodstuff.

4 Claims, 6 Drawing Sheets

(51) Int. Cl.
*A23L 3/3418* (2006.01)
*H01M 8/00* (2016.01)
*H01M 8/04* (2016.01)
*H01M 8/06* (2016.01)
*H01M 8/24* (2016.01)
*H01M 8/10* (2016.01)

(52) U.S. Cl.
CPC ....... *H01M 8/04201* (2013.01); *H01M 8/0662* (2013.01); *H01M 8/0668* (2013.01); *H01M 8/2475* (2013.01); *H01M 2008/1095* (2013.01); *H01M 2250/00* (2013.01); *Y02E 60/50* (2013.01)

(56) References Cited

U.S. PATENT DOCUMENTS

| | | |
|---|---|---|
| 3,437,428 A | 4/1969 | Quesada et al. |
| 3,598,518 A | 8/1971 | Goto |
| 3,937,847 A | 2/1976 | Elkins et al. |
| 3,992,271 A | 11/1976 | Danzig et al. |
| 4,039,409 A | 8/1977 | LaConti et al. |
| 4,212,891 A | 7/1980 | Fujita et al. |
| 4,311,569 A | 1/1982 | Dempsey et al. |
| 4,513,066 A | 4/1985 | Simon |
| 4,609,383 A | 9/1986 | Bonaventura et al. |
| 4,642,996 A | 2/1987 | Harris et al. |
| 4,746,562 A | 5/1988 | Fant |
| 4,784,863 A | 11/1988 | Lustig et al. |
| 4,817,391 A | 4/1989 | Roe et al. |
| 4,895,729 A | 1/1990 | Powrie et al. |
| 5,438,841 A | 8/1995 | Cahill-O'Brien et al. |
| 5,457,963 A | 10/1995 | Cahill-O'Brien et al. |
| 5,647,970 A | 7/1997 | Arata |
| 6,013,385 A | 1/2000 | DuBose |
| 6,171,368 B1 | 1/2001 | Maget et al. |
| 6,179,986 B1 | 1/2001 | Swette et al. |
| 6,180,146 B1 | 1/2001 | Del Gallo et al. |
| 6,230,614 B1 | 5/2001 | Del Gallo et al. |
| 6,256,905 B1 | 7/2001 | White et al. |
| 6,562,258 B1 | 5/2003 | Elsome et al. |
| 6,808,837 B2 | 10/2004 | Hirsch |
| 6,941,727 B2 | 9/2005 | Villers et al. |
| 7,014,898 B2 | 3/2006 | Ekman et al. |
| 8,187,653 B2 | 5/2012 | Bell et al. |
| 8,512,780 B2 | 8/2013 | Bell et al. |
| 2004/0229101 A1* | 11/2004 | Davis .................... 429/34 |
| 2006/0105219 A1 | 5/2006 | Anderson |
| 2006/0127734 A1 | 6/2006 | McLean et al. |
| 2007/0077470 A1 | 4/2007 | Adams et al. |
| 2007/0077480 A1 | 4/2007 | Curello et al. |
| 2007/0110861 A1 | 5/2007 | Hoffjann et al. |
| 2008/0145721 A1 | 6/2008 | Shapiro et al. |
| 2009/0081493 A1 | 3/2009 | Schrooten et al. |
| 2010/0159349 A1 | 6/2010 | Highgate et al. |
| 2011/0151070 A1 | 6/2011 | Bell |
| 2011/0151084 A1 | 6/2011 | Bell |

FOREIGN PATENT DOCUMENTS

| | | | |
|---|---|---|---|
| GB | 1027201 A * | 4/1966 | ........... A23L 3/3409 |
| JP | 55-45386 | 9/1978 | |
| JP | 09201182 A | 8/1997 | |
| JP | 2004095515 A | 3/2004 | |
| WO | WO99/05922 | 2/1999 | |

OTHER PUBLICATIONS

Larminie et al. (2003): Fuel Cell Systems Explained, Second Edition. John Wiley & Sons, Ltd. pp. 1-24.*
Tallaksen, "Scientist: GFF 30-day Claim Must Be Taken 'with a pinch of salt,'" IntraFish Media AS, Apr. 26, 2011.
Farber, "Microbiological Aspects of Modified-Atmosphere Packaging Technology: A Review," J. Food Protect. (1991) 54:58-70.
International Search Report & Written Opinion, PCT Application No. PCT/US2007/072417, Sep. 30, 2008.
Extended European Search Report, European Application No. 07812448.4, Jan. 3, 2013.
Letter (redacted) and informal translation of Argentinean Office Action received in connection with related Argentina Patent Application No. 2007 01 02947; letter dated Aug. 26, 2015.

* cited by examiner

SYSTEM AND METHODS FOR TRANSPORTING OR STORING OXIDATIVELY-DEGRADABLE FOODSTUFF

CROSS-REFERENCE TO RELATED APPLICATIONS

This application is a continuation of U.S. application Ser. No. 13/462,692, filed May 2, 2012, which is a divisional of U.S. application Ser. No. 11/769,944, filed Jun. 28, 2007, now U.S. Pat. No. 8,187,653, which claims the benefit under 35 U.S.C. §119(e) of U.S. Provisional Application Nos. 60/818,269, filed Jun. 30, 2006, and 60/871,566, filed Dec. 22, 2006.

FIELD OF THE INVENTION

This invention relates to systems and methods for increasing the storage-life of oxidatively-degradable foodstuffs such as harvested fresh fish.

BACKGROUND

The storage-life of oxidatively-degradable foodstuffs such as fish, meat, poultry, bakery goods, fruits, grains, and vegetables is limited in the presence of a normal atmospheric environment. The presence of oxygen at levels found in a normal atmospheric environment leads to changes in odor, flavor, color, and texture resulting in an overall deterioration in quality of the foods either by chemical effect or by growth of aerobic spoilage microorganisms.

Modified atmosphere packaging (MAP) has been used to improve storage-life and safety of stored foods by inhibition of spoilage organisms and pathogens. MAP is the replacement of the normal atmospheric environment in a food storage pack with a single gas or a mixture of gases. The gases used in MAP are most often combinations of oxygen ($O_2$), nitrogen ($N_2$), and carbon dioxide ($CO_2$). In most cases, the bacteriostatic effect is obtained by a combination of decreased $O_2$ and increased $CO_2$ concentrations. Farber, J. M. 1991. Microbiological aspects of modified-atmosphere packaging technology: a review. J. Food Protect. 54:58-70.

In traditional MAP systems, the MAP gas composition is not manipulated after the initial replacement of the normal atmospheric environment. Thus, the composition of the gases present in the food pack is likely to change over time due to diffusion of gases into and out of the product, diffusion of gases into and out of the food pack, and the effects of microbiological metabolism.

The use of MAP systems and related technologies have been in use for shipping and storage of foodstuff. However, these systems imposed significant limitations on the delivery of foodstuffs that are sensitive to oxidative degradation, such as fish. First and most important, the cooling and oxygen removal processes of these systems were integrated into a single sealed container (typically a refrigerated freight container—a reefer unit) such that upon opening the entire shipment was exposed to the ambient atmospheric conditions. This limited the ability to split the foodstuff into different delivery sites and typically required that the vendee acquire the entire product upon opening. Second, the integration of the oxygen removal process into the container dictated that inadvertent or premature breakage of the seal in the sealed container put the entire product at risk. Third, the integration of the oxygen removal processes into the freight container did not permit separate atmospheric conditions within the container during storing and/or transporting thereby limiting the flexibility of the process. Fourth, sealing of a freight container posed difficulties especially when the atmospheric pressure within the container became less than that outside of the container.

In addition to traditional MAP systems as discussed above, systems for transporting perishable foodstuffs using an external fuel cell to remove oxygen have been developed, such as disclosed by U.S. Pat. No. 6,179,986. This patent described the use of a fuel cell operated external to the sealed container to the extent that it required venting of at least one of the products of the fuel cell reaction to the outside of the sealed container. Additionally, the system described in the '986 patent required the use of a dedicated power supply to provide power to the fuel cell.

The systems described above have many disadvantages that make them undesirable for long-term transporting or storing of foodstuff that is oxidatively degradable. Thus, the need exists for an improved system that would increase the storage-life of oxidatively-degradable materials during transport and storage that avoids one or more of the disadvantages of conventional shipping and storage techniques. Additionally, it would be advantageous to have the ability to transport and then remove less than all of the modular packages of the transported foodstuff at various destinations without compromising the preserving environment of the remaining modular packages.

SUMMARY OF THE INVENTION

This invention provides for totes, packaging modules, systems, and methods useful in extending the storage-life of foodstuff and, in particular, fresh fish. One aspect of the invention provides for a pressure-stable sealable tote of limited oxygen permeability useful in transporting and/or storing of oxidatively-degradable foodstuffs. The tote comprises one or more fuel cells, contained internal to the tote, that are capable of converting hydrogen and oxygen into water. In one embodiment, the tote further comprises a holding element suitable for maintaining a hydrogen source internal to the tote. The holding element for the hydrogen source in the tote preferably is a box configured to hold the hydrogen source and the fuel cell. Alternatively, the hydrogen source can be external to the tote provided that an external hydrogen source is in gaseous communication with anode of the fuel cell thereby providing hydrogen internally to the tote.

In preferred embodiments, the tote is selected from the group consisting of a tote comprising a flexible, collapsible or expandable material which does not puncture when collapsing or expanding; and a tote comprising a rigid material capable of maintaining its structural integrity up to a pressure differential between the outside pressure and the inside pressure of up to about 0.5 atm.

Another aspect of the invention provides for a packaging module useful in transporting and/or storing of oxidatively-degradable foodstuffs which comprises a pressure-stable sealed tote of limited oxygen permeability, an oxidatively-degradable foodstuff, a fuel cell internal to the tote that is capable of converting hydrogen and oxygen into water, and hydrogen internal to the tote.

Yet another aspect of the invention provides for a system useful in transporting and/or storing of oxidatively-degradable foodstuffs which comprises one or more packaging modules. Each packaging module comprises a pressure-stable sealed tote of limited oxygen permeability, an oxidatively-degradable foodstuff, a fuel cell internal to the tote that is capable of converting hydrogen and oxygen into water, and hydrogen internal to the tote.

In preferred embodiments of the packaging modules and system, the tote is selected from the group consisting of a tote comprising a flexible, collapsible or expandable material which does not puncture when collapsing or expanding and a tote comprising a rigid material capable of maintaining its structural integrity up to a pressure differential between the outside pressure and the inside pressure of up to about 0.5 atm. In some embodiments, the packaging module further comprises a holding element suitable for maintaining a hydrogen source internal to the tote; preferably the holding element for the hydrogen source in the tote is a box configured to hold the hydrogen source and the fuel cell. In other embodiments, the hydrogen source can be external to the tote provided that an external hydrogen source is in gaseous communication with anode of the fuel cell thereby providing hydrogen internally to the tote.

In a further preferred embodiment, the packaging module does not contain a gaseous source to maintain positive pressure within the packaging module during transport or storage.

The oxidatively-degradable foodstuffs to be transported and/or stored are preferably fish. More preferably, the fish is freshly harvested fish selected from the group consisting of salmon, tilapia, tuna, shrimp, trout, catfish, sea bream, sea bass, striped bass, red drum, pompano, haddock, hake, halibut, cod, and arctic char. Most preferably, the fresh fish to be transported and/or stored is salmon or tilapia.

Additionally, in some embodiments, the hydrogen source is either a bladder hydrogen source, a rigid container hydrogen source, or a gaseous mixture comprising carbon dioxide and less than 5% by volume hydrogen. As above, the hydrogen source can be internal or external to the tote/module. In some embodiments the packaging module further comprises a fan, preferably the fan is powered by the fuel cell.

The system, in some embodiments, further comprises a temperature control system external to the packaging module to maintain the temperature inside the module at a level sufficient to maintain freshness of the foodstuff.

Another aspect of the invention provides for a method for transporting and/or storing of oxidatively-degradable foodstuffs using the packaging modules described above. The method comprises the steps of removing the oxygen in a packaging module containing an oxidatively-degradable material to generate a reduced oxygen environment within a packaging module, sealing the tote, operating the fuel cell during transport or storing such that oxygen is converted to water by the hydrogen present in the tote to maintain the reduced oxygen environment within the tote, and transporting or storing the material in the tote. The packaging module comprises a pressure-stable sealable tote of limited oxygen permeability, a fuel cell internal to said tote, and a hydrogen source which provides hydrogen internal to the tote.

Yet another aspect of the invention provides for a method for transporting and/or storing of oxidatively-degradable foodstuffs which comprises the steps of obtaining a pressure-stable sealed tote of limited oxygen permeability containing an oxidatively-degradable material, wherein the tote is connected to a module comprising a fuel cell and a source of hydrogen such that the anode of the fuel cell is in direct communication with the environment of the tote, operating the fuel cell during transport or storing such that oxygen in the tote is converted to water by the fuel cell, and transporting or storing the material in the tote. In some embodiments of this aspect of the invention, the module is disconnected from the tote after an initial period of time that is sufficient to allow a natural minimization or cessation of gaseous exchange. In some embodiments, the initial period of time is between about 0.5 and 50 hours. In still some embodiments, the module is disconnected from the tote when the oxygen level reaches and is maintained below a predetermined level. In some embodiments, the predetermined level of oxygen is below 5% oxygen v/v. In some preferred embodiments, the predetermined level of oxygen is below 1% oxygen v/v.

In other embodiments, the fuel cell is programmed to cease operation after an initial period of time that is sufficient to allow a natural minimization or cessation of gaseous exchange. In some embodiments, the initial period of time is between about 0.5 and 50 hours. In still other embodiments, the fuel cell is programmed to cease operation when the oxygen level reaches and is maintained below a predetermined level. In some embodiments, the predetermined level of oxygen is below 5% oxygen v/v. In some preferred embodiments, the predetermined level of oxygen is below 1% oxygen v/v.

Yet another aspect of the invention provides a pressure-stable sealable tote of limited oxygen permeability useful in transporting and/or storing of oxidatively-degradable foodstuffs which comprises a fuel cell capable of converting hydrogen and oxygen into water where the fuel cell is internal to the tote; a holding element suitable for maintaining a hydrogen source internal to the tote or an inlet in gaseous communication with the anode of the fuel cell from an external hydrogen source; and a carbon dioxide remover in communication with the fuel cell anode. In some embodiments, the carbon dioxide remover comprises hydrated lime.

The carbon dioxide remover or carbon dioxide absorber or carbon dioxide scrubber are used interchangeably herein.

In one embodiment, the oxygen removal process occurs before adding the foodstuff to the tote; in another embodiment it occurs after adding the foodstuff to the tote.

The method can be used in the transporting or storing the foodstuff for a time period up to 100 days. For example, the time period for storage is from between 5 and 50 days, or alternatively, from between 15 and 45 days. In some embodiments, the method further comprises maintaining a temperature in the tote sufficient to maintain freshness of the material during transport or storage.

In preferred embodiments, the method is performed so that the reduced oxygen environment comprises less than 1% oxygen, or alternatively, the reduced oxygen environment comprises less than 0.1% oxygen, or alternatively, the reduced oxygen environment comprises less than 0.01% oxygen.

Preferably, the reduced oxygen environment comprises low (<0.1% $O_2$) to no oxygen, carbon dioxide, nitrogen, and low (<0.1% $H_2$) to no hydrogen; comprises carbon dioxide and hydrogen; comprises carbon dioxide and nitrogen; comprises nitrogen; or comprises carbon dioxide, nitrogen, and hydrogen.

BRIEF DESCRIPTION OF THE DRAWINGS

This invention will be further described with reference being made to the accompanying drawings.

DETAILED DESCRIPTION

Figure 1:
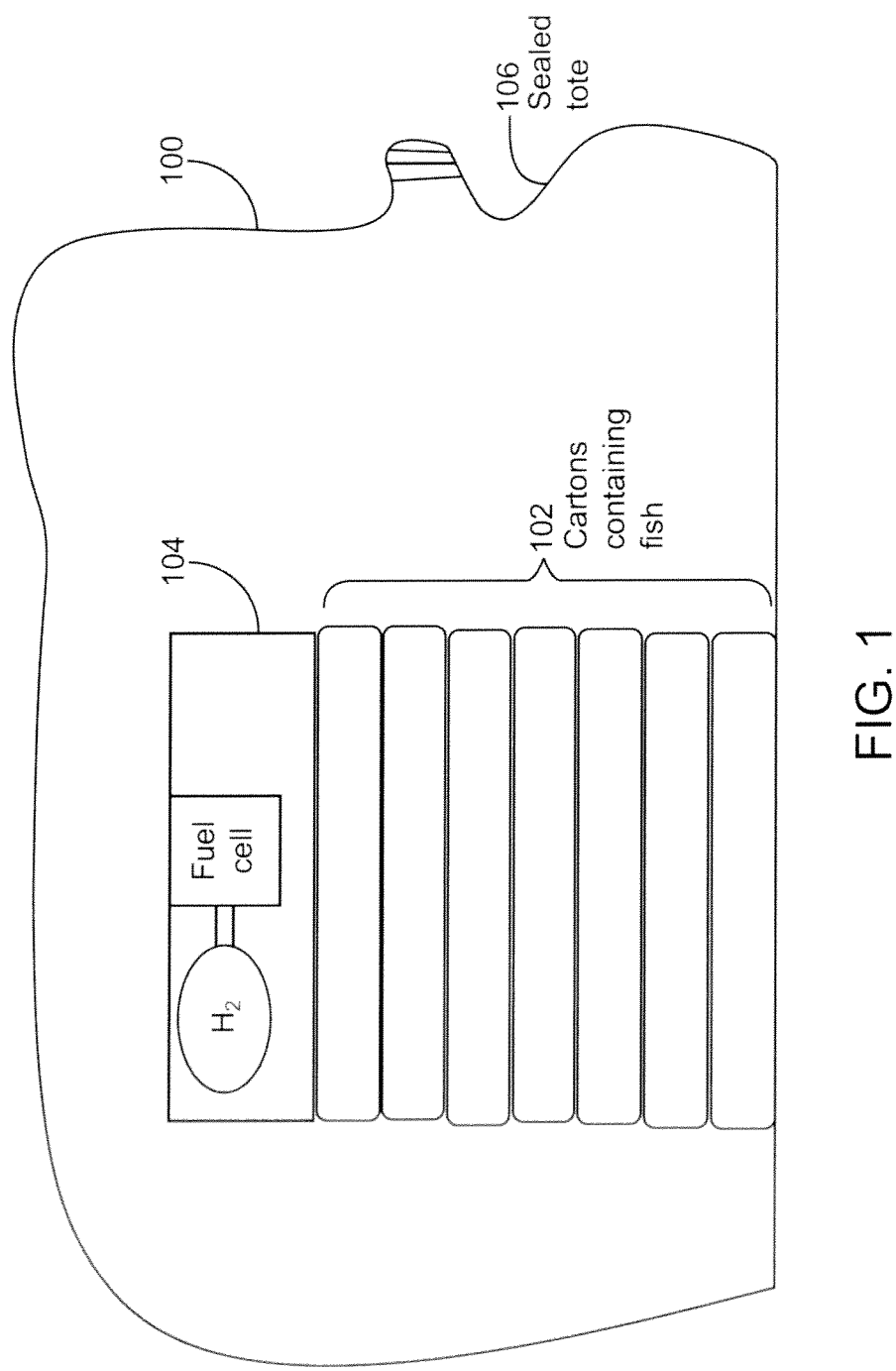
FIG. 1 is a schematic of a packaging module used to transport or store oxidatively-degradable material.

The present invention encompasses systems and methods useful for transporting and storing oxidatively-degradable foodstuffs. The systems and methods described herein allow for the continuous removal of oxygen from the atmospheric environment surrounding the foodstuff which is stored in an individual tote in a shipping container.

The totes or packaging modules used in this invention, as described more completely below, preferably do not incorporate an integrated temperature control system but rather rely upon the temperature control system of the shipping container in which they are shipped. In addition, the tote or packaging module is designed to withstand or compensate for the internal pressure loss (or gain) during transport and/or shipment.

The removal of oxygen during transport and/or storage allows for a controlled reduced oxygen environment that is suitable to maintain the freshness of the material for a prolonged period. As a result, oxidatively-degradable materials can be transported and/or stored for longer periods of time than are currently possible using conventional shipping and storage techniques. The system and methods described herein allow, for example, the use of shipping freighters to transport oxidatively-degradable materials such as fish to markets that would normally only be served by more expensive air shipping. It is contemplated that the present invention could also be used to allow the long term storage and preservation of other oxidatively degradable materials, such as, for example, artifacts, manuscripts, and other materials that require protection from even minimal exposure to oxygen. In such an embodiment, storage time is greatly enhanced to include up to ten years or more.

In one embodiment, this invention provides systems and methods useful for extending the storage life of oxidatively-degradable foodstuffs. In a preferred embodiment, the oxidatively-degradable foodstuff is non-respiratory. Non-respiratory foodstuffs do not respire. That is to say that these foodstuffs do not take in oxygen with an associated release of carbon dioxide. Examples of non-respiratory foodstuff include harvested fresh or processed fish, meat (such as beef, pork, and lamb), poultry (such as chicken, turkey, and other wild and domestic fowl), and bakery goods (such as bread, tortillas, and pastries, packaged mixes use to generate bread and pastries, and grain-based snack foods). Preferred non-respiratory foodstuff to be transported/and or stored by the systems and methods of this invention include harvested fresh or processed fish, such as salmon, tilapia, tuna, shrimp, trout, catfish, sea bream, sea bass, striped bass, red drum, pompano, haddock, hake, halibut, cod, arctic char, shellfish, and other seafood. More preferably, the non-respiratory foodstuff is fresh salmon or fresh tilapia, and most preferably the non-respiratory foodstuff fresh Chilean Atlantic farmed salmon.

In general, the systems and methods of the invention involve a packaging module comprising a tote, the oxidatively-degradable foodstuff to be transported and/or stored, and a device that removes oxygen, preferably on a continuous basis, from inside the tote when oxygen is present, preferably below a predetermined level, so as to control the gaseous environment surrounding the foodstuff at least for a portion of the storage and/or transportation period. This device is also referred to as an oxygen remover. In some cases, it will be desirable to employ more than one oxygen remover to more effectively remove oxygen from the tote environment. The oxidatively-degradable foodstuff is inserted into the tote and the environment in the tote is manipulated to create a reduced oxygen environment in the tote. In a preferred embodiment, the reduced oxygen environment within the tote is created by flushing the environment within the tote via application of a vacuum and/or introduction of a low oxygen gaseous source. After flushing of the tote, the environment within the tote is a reduced oxygen environment The tote is then sealed. Preferably, the oxygen remover operates throughout the duration of the transport and/or storage when oxygen is present to maintain the reduced oxygen environment within the packaging module, thus maintaining the freshness of the oxidatively-degradable material.

One aspect of the invention provides for a pressure-stable sealable tote of limited oxygen permeability useful in transporting and/or storing of oxidatively-degradable foodstuffs. A pressure-stable tote is a tote that will allow for preservation of the material within the tote in view of the pressure differential that occurs during a prolonged transport or storage under the reduced oxygen conditions defined herein. This pressure differential is a result of a decrease or increase in the volume of gas present in the tote due to gaseous absorption or release during transporting and/or storing. Preferably, the pressure-stable sealable tote of limited oxygen permeability is either a tote comprising a flexible, collapsible or expandable material which does not puncture when collapsing or expanding or a tote comprising a rigid material.

A tote made of a flexible, collapsible or expandable material which does not puncture when collapsing or expanding eliminates the need for compensating for the pressure differential through the use of methods such as the use of a gaseous source to maintain positive pressure within the tote during transport and/or storage. Accordingly, in a preferred embodiment, the tote does not require an introduced gaseous source to maintain pressure within the tote. These totes are, in general, constructed of flexible cast or extruded plastic sheeting.

The flexible, collapsible or expandable tote material is one of limited oxygen permeability. Materials of limited oxygen permeability preferably have an oxygen transmission rate (OTR) of less than 10 cubic centimeters/100 square inch/24 hours/atm., more preferable materials of limited oxygen permeability are materials having an OTR of less than 5 cubic centimeters/100 square inch/24 hours/atm., even more preferably materials of limited oxygen permeability materials having an OTR of less than 2 cubic centimeters/100 square inch/24 hours/atm.; most preferably materials of limited oxygen permeability are materials having an OTR of less than 1 cubic centimeters/100 square inch/24 hours/atm. A non-exhaustive list of materials that can be used to make the flexible, collapsible or expandable tote is shown in Table 1.

TABLE 1

| MATERIAL | Moisture Vapor Transmission Rate (MVTR) (gm/100 sq. in./24 hours) | Oxygen Transmission Rate OTR (c.c./100 sq. in./24 hours/atm.) |
|---|---|---|
| SARAN ® (vinylidene chloride copolymer resin or film) Dow Chemical Company 1 mil | 0.2 | .8-1.1 |
| SARAN ® HB (vinylidene choride/vinyl chloride copolymer resin or film) Dow Chemical Company 1 mil | 0.05 | 0.08 |
| SARANEX ® (a coextruded multilayered film containing a layer of SARAN ® resin integrally sandwiched between outer layers of polyolefins) Dow Chemical Company | 0.2 | 0.5 |
| ACLAR ® 33C (copolymer film consisting primarily of chlorotrifluoroethylene) Honeywell .75 mil (military grade) | 0.035 | 7 |
| BAREX ® 210 (high barrier, impact modified acrylonitrile-methyl acrylate copolymer), British Petroleum 1 mil | 4.5 | 0.7 |
| Polyester 48 Ga. | 2.8 | 9 |
| 50 M-30 Polyester Film | 2.8 | 9 |
| 50 M-30 PVDC Coated Polyester | 0.4 | 0.5 |
| Metallized Polyester 48 Ga. | 0.05 | .08-.14 |
| Nylon (not trademarked) Dupont 1 mil | 19-20 | 2.6 |
| Metallized Nylon 48 Ga. | 0.2 | 0.05 |
| PVDC-Nylon 1 mil | 0.2 | 0.5 |
| 250 K Cello | 0.5 | 0.5 |
| 195 MSBO Cello | 45-65 | 1-2 |
| LDPE 2 mil | 0.6 | 275 |
| Opp .9 mil | 0.45 | 80 |
| EVAL ® (ethylene vinyl alcohol (EVOH) copolymer) EVAL of America, Biax 60 Ga. - Subsidiary of Kuraray Co. Ltd. 1 mil | 2.6 | 0.03 |
| EVAL ® (ethylene vinyl alcohol (EVOH) copolymer) EVAL of America, EF-E - Subsidiary of Kuraray Co. Ltd. 1 mil | 1.4 | 0.21 |
| EVAL ® (ethylene vinyl alcohol (EVOH) copolymer) EVAL of America, EF-F - Subsidiary of Kuraray Co. Ltd. 1 mil | 3.8 | 0.025 |
| Benyl H 60 Ga. | 0.7 | 0.4 |
| PVC 1 mil | 4-5 | 8-20 |
| Polycarbonate 1 mil | 9 | 160 |
| Polystyrene[[®]] Dow Chemical Company 1 mil | 7.2 | 4,800 |
| Pliofilm 1 mil | 1.7 | 660 |

A rigid material is any material that is self supporting in its geometry and that cannot be readily folded, collapsed, expanded, or compressed. In general, a tote comprised of rigid material is made of molded plastic or metal or similar material and can be in the form of boxes, rooms, ship holds, or refrigerated containers. A rigid material is preferably any material capable of maintaining its structural integrity up to a pressure differential between the outside pressure and the inside pressure of up to about 0.3 atm, more preferably the rigid material is capable of maintaining its structural integrity up to a pressure differential between the outside pressure and the inside pressure of up to about 0.4 atm, most preferably the rigid material is capable of maintaining its structural integrity up to a pressure differential between the outside pressure and the inside pressure of up to about 0.5 atm. Additionally, the invention also contemplates the use of a tote comprising a rigid material that benefits from compensation for the pressure differential generated as a result of a decrease or increase in the volume of gas present in the tote. Compensation for the pressure differential can be accomplished in a number of ways known in the art including, but not limited to, use of a gaseous source to maintain positive pressure and use of a bladder that can expand or contract in response to a pressure differential. The rigid material is any material that is capable of maintaining a rigid structure. Examples of rigid materials include, but are not limited to, rigid plastics capable of maintaining a rigid structure including acrylics, such as fiberglass, polycarbonates such as Lexan, polyethylene, polypropylene, polyvinyl chloride (PVC), styrene, polyesters, nylatron polyurethane, lucite, polyvinylidene fluoride (PVDF), polysulfone, and the like, and other materials, such as metals, that are capable of maintaining a rigid structure.

The tote further comprises one or more oxygen removers to remove oxygen from the environment within the tote as long as oxygen is present. The oxygen remover maintains the reduced oxygen environment within the tote by removing oxygen that may be introduced into the system after the tote is sealed. For example, oxygen may be introduced by diffusion through the tote through the material of limited oxygen permeability or at the seal of the tote. Oxygen may also be released by the oxidatively-degradable foodstuff within the tote or from containers in which the foodstuff is packaged.

In a preferred embodiment, the oxygen remover is a molecular oxygen-consuming fuel cell. Preferably the fuel cell is a hydrogen fuel cell. As used herein, a "hydrogen fuel cell" is any device capable of converting oxygen and hydrogen into water. In a preferred embodiment, the complete fuel cell is internal to the tote. This can be achieved by having hydrogen internal to the tote or packaging module. The anode of the fuel cell is in communication with the hydrogen source. The hydrogen permits generation of protons and electrons. The cathode of the fuel cell is in communication with the environment in the tote (the oxygen source). In the presence of oxygen, the protons and electrons generated by the anode interact with the oxygen present at the cathode to generate water. In a preferred embodiment, the fuel cell does not require an external power source to convert oxygen and hydrogen into water. In a further embodiment, the fuel cell is connected to an indicator that indicates when the fuel cell is operating and when hydrogen is available.

In another embodiment, the physical fuel cell is external to the tote but in direct communication with the gaseous environment of the tote in such a manner that the products produced at the anode and cathode are maintained internal to the tote. In such an embodiment, the fuel cell is construed as internal to the tote since its products are maintained internal to the tote.

In one embodiment, the hydrogen is a pure hydrogen gas. The hydrogen source is preferably contained within a bladder or other hydrogen source which is contained either internally or externally to the tote but the hydrogen is provided internally to the tote so that the entire reaction process is contained within the tote. The hydrogen is preferably in direct communication with the anode of the hydrogen fuel cell in such a manner as to provide hydrogen preferably for the duration of the transporting or storage time. When used, the bladder is made of any material that is capable of containing the hydrogen gas. For example, the materials listed in Table 1 can be used as bladder material.

In another embodiment, the bladder contains an uncompressed hydrogen source although compressed sources of hydrogen can be used.

In still another embodiment, the hydrogen source is contained within a rigid container, such as a gas cylinder, contained internally or externally to the tote but where the hydrogen is provided internally to the tote so that the entire reaction process is contained within the tote. In this embodiment, the hydrogen source is a compressed or uncompressed hydrogen source. The rigid container is in direct communication with the anode of the hydrogen fuel cell in such a manner as to provide hydrogen for the duration of the transporting or storage time. Compressed hydrogen sources are preferably are maintained at a pressure of no greater than 10,000 psia and preferably no greater than 40 psia.

In further embodiments, the hydrogen source is generated by a chemical reaction. Examples of methods of chemically generating hydrogen are well known in the art and include generation of hydrogen by an electrolytic process, including methods using PEM electrolyzers, alkaline electrolyzers using sodium or potassium hydroxide, solid oxide electrolyzers, and generation of hydrogen from sodium borohydride. In each case, the hydrogen can be generated internally or externally to the tote so long as the hydrogen is made available internally to the anode of the fuel cell.

In another embodiment, the hydrogen source is a gaseous mixture comprising hydrogen present in the environment of the tote. In this embodiment, the gaseous mixture preferably comprises carbon dioxide and hydrogen. In other embodiments, the gaseous mixture comprises nitrogen and hydrogen. In further embodiments, the gaseous mixture comprises hydrogen, carbon dioxide, and nitrogen. It is contemplated that other inert gases such can be present in the gaseous mixture. The amount of hydrogen present in the gaseous mixture is preferably less than 10% hydrogen by volume, more preferably less than 5% hydrogen by volume, most preferably less than 2% hydrogen by volume. This gaseous mixture is introduced into the tote before, during, or after the introduction of the oxidatively-degradable material and prior to the sealing of the tote.

It is understood that the term "hydrogen internal to the tote" or "hydrogen source internal to the tote" means that gaseous hydrogen is inside the tote and in gaseous communication with the anode of the fuel cell such that the hydrogen will react with oxygen to produce water. Whether the ultimate source of hydrogen is internal or external is immaterial provided that gaseous hydrogen is in the tote and in gaseous communication with the anode so as to react with the oxygen.

In some embodiments, the tote comprises a carbon dioxide remover. Carbon dioxide has the potential to permeate across the PEM to anode plate, thereby interfering with hydrogen access to the anode plate. Removal of some or all of the carbon dioxide from the anode plate of the fuel cell by the carbon dioxide remover allows increased access to the fuel cell by hydrogen and thus increasing the fuel cells ability to remove oxygen from the tote environment.

There are numerous processes known in the art that can be utilized in the carbon dioxide remover. These methods include absorption processes, adsorption processes, such as pressure-swing adsorption (PSA) and thermal swing adsorption (TSA) methods, and membrane-based carbon dioxide removal. Compounds that can be used in the carbon dioxide removers include, but are not limited to, hydrated lime, activated carbon, lithium hydroxide, and metal oxides such as silver oxide, magnesium oxide, and zinc oxide. Carbon dioxide can also be removed from the anode by purging the anode with a gas, such as hydrogen gas or water vapor.

Figure 5:
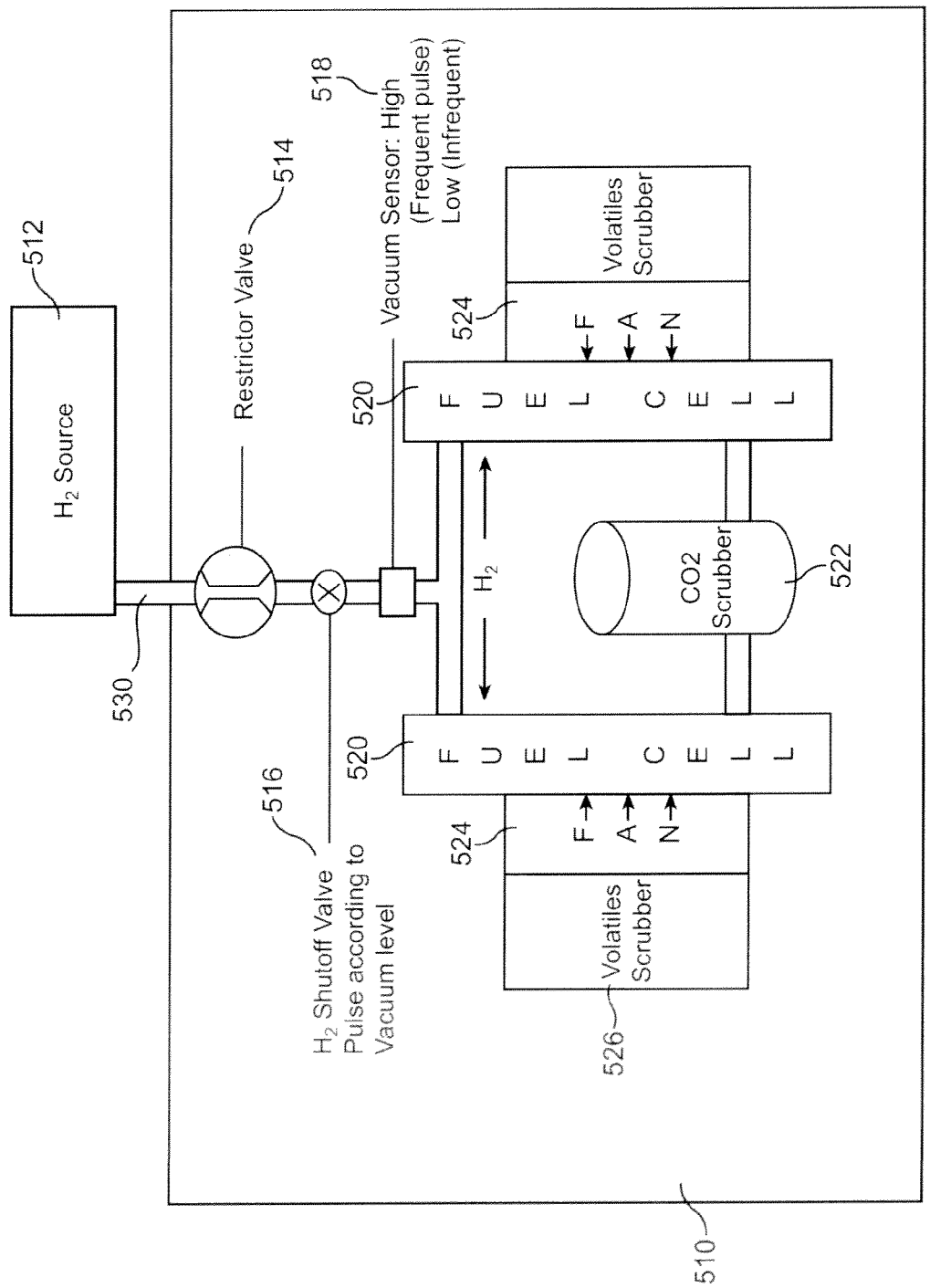
FIG. 5 is a schematic of a fuel cell system comprising two fuel cells, fans, volatile scrubbers such as activated carbon absorbers and a carbon dioxide remover.
Figure 6:
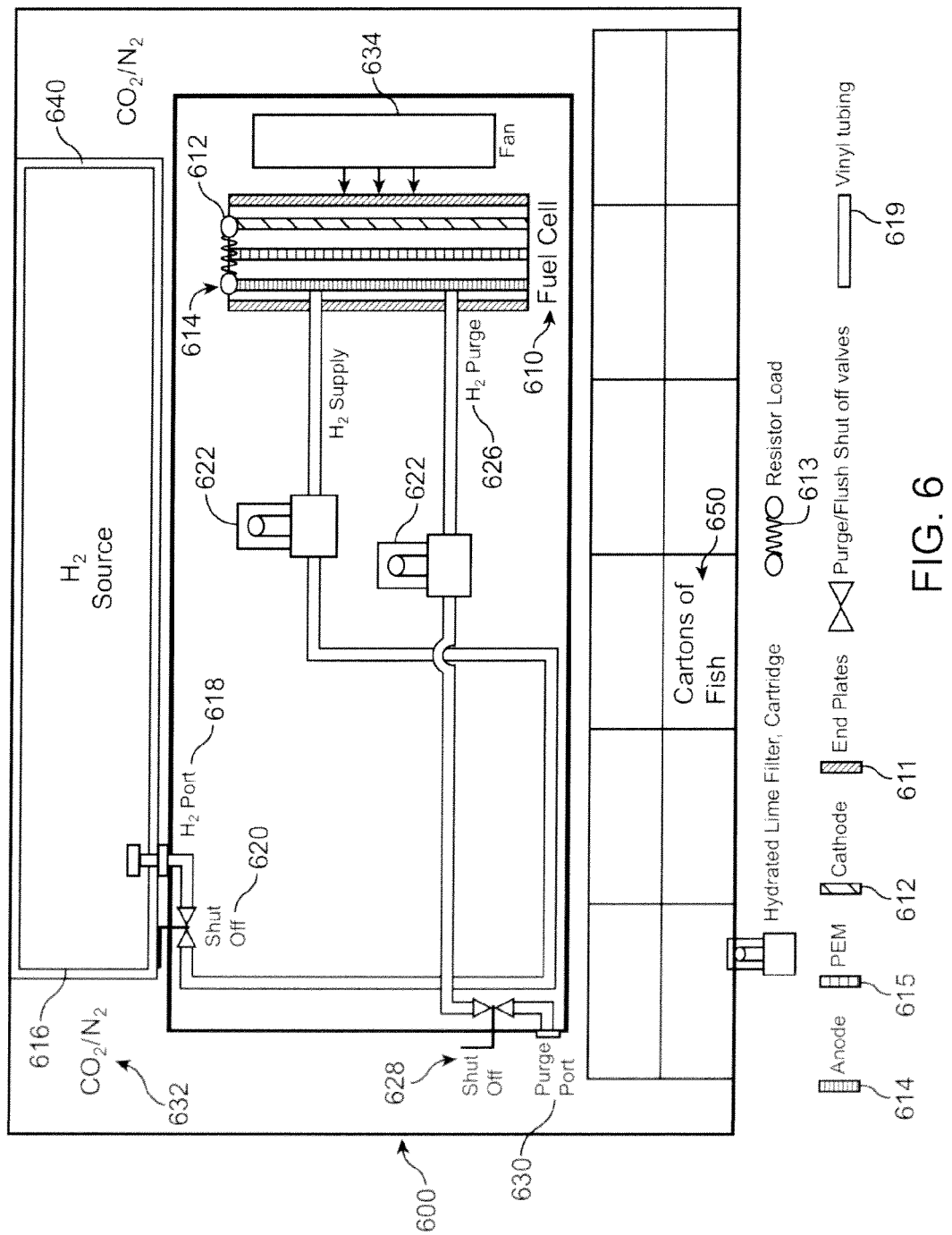
FIG. 6 is a schematic of a fuel cell embodiment of the oxygen remover with a carbon dioxide remover.

In one embodiment, the carbon dioxide remover comprises hydrated lime. In one example of this embodiment, the hydrated lime is contained in a filter cartridge that is in vapor communication with the fuel cell anode so that the carbon dioxide present at anode plate of the fuel cell comes into contact with and is absorbed into the hydrated lime. A particular embodiment comprises a single hydrated lime filter cartridge in vapor communication with the anode outlet as shown in FIG. 5. In another embodiment, two hydrated lime filter cartridges, are each in vapor communication with an anode outlet (FIG. 6). In each case, the hydrated lime filter(s) facilitate removal of carbon dioxide from the anode plate of the fuel cell.

In some embodiments, the tote is configured to provide access for tubes, wires, and the like such that external gases such as hydrogen can be introduced into the tote or an external power source can be used to operate fans and oxygen remover. The access is provided using fittings that are sealable and can maintain the low oxygen environment within the tote. In one particular embodiment, the tote is configured to permit introduction of hydrogen from an external source into the internal fuel cell hydrogen supply system. In a further embodiment, the external hydrogen source is directed to assist with purging the fuel cell with hydrogen.

Oxygen removers other than hydrogen fuel cells can be used to remove oxygen in the tote. For example, oxygen absorbers, such as iron containing absorbers, and oxygen adsorbers, can be used. Oxygen absorbers and adsorbers are known in the art and are commercially available. Oxygen removers also include removers utilizing pressure swing adsorption methods (PSA) and membrane separation methods.

Catalytic systems, such as those utilizing elemental metal such as platinum or palladium catalysts, can be used as oxygen removers but the use of powders necessary to provide high catalytic surface area runs the risk of contamination. Nevertheless, when appropriate safeguards are used, these can be employed. Such safeguards include embedding the metal catalysts into a membrane electrode assembly such as present in PEM fuel cells.

In one embodiment, the tote further comprises a holding element suitable for maintaining the hydrogen source so as the hydrogen source is held stably within the tote. For example, the holding element is a box configured to stably hold the hydrogen source. In a further aspect of this embodiment, the holding element is configured to hold both the hydrogen source and the fuel cell. In other embodiments, the holding element is a sleeve affixed to an internal wall of the tote. This sleeve is capable of holding a bladder-containing hydrogen source or rigid container hydrogen source as well as other containers suitable for containing a hydrogen source. In either event, the hydrogen source is in direct communication with the anode of the fuel cell.

When the oxygen remover used in the packaging module is a hydrogen fuel cell, there will be an amount of water, in either liquid or gaseous form, generated as a result of the reaction of hydrogen and oxygen. The water thus generated is released into the tote. It may be desirable to include within the tote a means for containing or removing the water. For example, the tote may further comprise a water-holding apparatus, such as a tray or tank, configured to collect the water as it is generated at the fuel cell. Alternatively, the tote may contain desiccant or absorbent material that is used to absorb and contain the water. Suitable desiccants and absorbent materials are well known in the art. The water may alternatively be vented outside of the tote, thus providing a suitable environment for the storage and transportation of goods that are optimally stored in dry environments.

The tote is configured to maintain a reduced oxygen environment surrounding the material. The reduced oxygen environment allows for the material to be stored and/or transported for a prolonged period while maintaining freshness of the material. Subsequent to or after the introduction of the material but prior to the sealing of the tote, the environment within the tote is optionally flushed via application of a vacuum and/or introduction of a low oxygen free gaseous source. At this point, the environment within the tote is a reduced oxygen environment. In a particular embodiment, the level of oxygen in the reduced oxygen environment is less than 1% oxygen, or alternatively, the level of oxygen in the reduced oxygen environment is less than 0.1% oxygen, or alternatively, the level of oxygen in the reduced oxygen environment is less than 0.01% oxygen.

In some embodiments, a low oxygen gaseous source is introduced into the tote before the tote is sealed. The low oxygen gaseous source is preferably comprised of $CO_2$ or mixture of gases containing $CO_2$ as one of its components. $CO_2$ is colorless, odorless, noncombustible, and bacteriostatic and it does not leave toxic residues on foods. In one embodiment, the low oxygen gaseous source is 100% $CO_2$. In another embodiment, the low oxygen gaseous source is a mixture of $CO_2$ and nitrogen or other inert gas. Examples of inert gases include, but are not limited, to argon, krypton, helium, nitric oxide, nitrous oxide, and xenon. The identity of the low oxygen gaseous source can be varied as suitable for the foodstuff and is well within the knowledge and skill of the art. For example, the low oxygen gaseous source used for transport and storage of salmon is preferably 100% $CO_2$. Other fish, such as tilapia are preferably stored or shipped using 60% $CO_2$ and 40% nitrogen as the low oxygen gaseous source.

The tote contains a headspace volume that allows for absorption of gases, such as oxygen and the low oxygen gaseous source. In some embodiments, the headspace is from about 5% to about 95% of the internal volume of the tote. In other embodiments, the headspace is from about 15% to about 40% of the internal volume of the tote, or alternatively, the headspace is about 20% to 35% of the internal volume of the tote.

The tote is configured such that the internal tote environment is in communication with oxygen remover permitting the removal of molecular oxygen from the internal tote environment as long as there is oxygen present in the tote environment, preferably below a predetermined level. The oxygen remover in the tote is configured to remove oxygen from the internal tote environment such that the oxygen level remains below a level that would result in a reduction of freshness or spoilage of the material. This reduced level of oxygen is maintained by the oxygen remover for the duration of the transport and/or storage. The level of oxygen in the reduced oxygen environment is less than 1% oxygen, more preferably less than 0.1%, most preferably less than 0.01% oxygen.

The efficiency of the oxygen removers can be enhanced through the use of a fan to circulate the air within the tote thus facilitating contact between the oxygen remover and the oxygen in the tote environment. When using a fuel cell, the fan, in certain embodiments, can be configured to run from the energy created when the fuel cell converts the hydrogen and oxygen to water.

In the event of a breach in the integrity of the tote wherein an unexpectedly large amount of oxygen-containing air is introduced into the tote environment, the oxygen remover would not be able to remove all of the introduced oxygen. In a preferred embodiment, the tote further comprises an indicator which would alert one to the fact that the oxygen level in the tote had exceeded the levels described as a reduced oxygen environment.

The tote optionally contains monitors to monitor oxygen levels, hydrogen levels, fuel cell operation, and temperature. In a particular embodiment, a oxygen sensor, for example, a trace oxygen sensor (Teledyne), is used to monitor the level of oxygen present in the tote environment.

Another aspect of the invention provides for a packaging module useful for transporting and/or storing of oxidatively-degradable material. The packaging module comprises a tote configured as described above. In the packaging module the tote is sealed and contains the oxidatively-degradable material to be transported and/or stored, and a device that removes oxygen from the environment surrounding the material as long as there is oxygen present, preferably below a predetermined level. The device is located within the sealed tote. Temperature control means such as air conditioning, heating and the like are preferably not integrated into the packaging module and the size of the module is such that the freight container comprising a single temperature control means can contain multiple modules. In such cases, it is possible for each tote to have different gaseous environments and different packaged materials.

Another aspect of the invention provides for a system for transporting or storing oxidatively-degradable foodstuff. The system preferably comprises a plurality of the packaging modules, each packaging module comprising a tote, an oxidatively-degradable foodstuff and an oxygen remover. The packaging module and components thereof are described above.

The system is configured so as to be suitable for transporting or storing in a shipping freighter. A shipping freighter means any container that can be used to transport and/or store the system including, but not limited to, an ocean shipping freighter, a trucking shipping freighter (such as a tractor-trailer), a railroad car, and an airplane capable of transporting cargo load.

As noted above, one or more packaging modules can be used in a single shipping freighter and, accordingly, each packaging module can be configured to have a different gaseous environment as well as a different foodstuff. Further, at delivery, opening of the shipping freighter does not result in disruption of the atmospheric control of any packaging module and, accordingly, one or more of the packaging modules can be delivered at one site and the others at different site(s). The size of each packaging module in the system can be configured prior to shipment to correspond to the quantity of foodstuff desired by each vendee. As such, the packaging modules can preferably be sized to contain as little as a few ounces of foodstuff to as much as, or greater than, 50,000 pounds of foodstuff. The number of packaging modules per system depends both on the size of the shipping freighter used to transport and/or store the system and the size of the packaging modules. Specific examples of the number of packaging modules per system is set forth in the description of specific embodiments below.

In another embodiment, the system comprises one or more totes, each tote containing an oxidatively-degradable foodstuff. In this embodiment, the totes are detachably connected to a separate module that contains the oxygen remover. The separate module also contains hydrogen when the oxygen remover is a hydrogen fuel cell. The oxygen remover acts to remove oxygen from all of the totes to which the separate module is connected. In this embodiment, the physical fuel cell is external to the tote but in direct communication with the gaseous environment of the tote in such a manner that the products produced at the anode and cathode are maintained internal to the tote. In such an embodiment, the fuel cell is construed as internal to the tote since its products are maintained internally to the tote. In a preferred embodiment, the tote is a rigid tote and the separate module further contains a gaseous source to maintain positive pressure in the connected totes. The container optionally contains monitors to monitor oxygen levels, hydrogen levels, and temperature within the totes as well as an indicator that indicates fuel cell operation. In one embodiment, the module is a box that is of similar size to the packaging modules. In another embodiment, the module is affixed to wall, lid, or door of the shipping freighter used to transport and/or store the system.

In some embodiments, the system and/or the shipping freighter also comprises a cooling system for maintaining a temperature of the packaging modules sufficient to preserve the freshness of the oxidatively-degradable foodstuff. The temperature required to preserve the freshness of the oxidatively-degradable foodstuff is dependent on the nature of this foodstuff. One of skill in the art would know, or would be able to determine, the appropriate temperature required for the material being transported or stored in the system or shipping freighter. For the transport and/or storage of foodstuffs the temperature would generally not be below 32° F. (Fahrenheit) to avoid freezing of the foodstuff. The temperature is generally maintained in a range of 32-38° F., more preferably in a range of 32-35° F., most preferably in a range of 32-33° F. For example, the appropriate temperature to preserve fish during transport or storage is between 32-35° F. Variation in the temperature is allowed as long as the temperature is maintained within a range to preserve the foodstuff. In some embodiments, the tote further comprises a device for monitoring and/or logging the temperature of the system or container. Such devices are commercially available from manufacturers including Sensitech, Temptale, Logtag, Dickson, Marathon, Testo, and Hobo.

In one embodiment, the system is capable of maintaining the packaging module at a foodstuff-preserving refrigerated temperature. Alternatively, the shipping freighter used to transport and/or store the system is a refrigerated shipping freighter capable of maintaining packaging module at a foodstuff-preserving refrigerated temperature.

It is contemplated that not all of the hydrogen internal to the tote will react with the fuel cell and thereby can be exposed to the foodstuff in the tote. Such unreacted hydrogen is referred to herein as "excess hydrogen" and it is desirable to limit the exposure of the foodstuff to such excess hydrogen during transport or storage. Accordingly, in some embodiments, the tote or system is configured to minimize the exposure of the foodstuff to excess hydrogen present in the tote environment. This can be achieved by removing the excess hydrogen in the tote or system by mechanical methods, chemical methods, or combinations thereof. Examples of chemical methods of removing excess hydrogen include the use a hydrogen sink comprised of polymers or other compounds that absorb hydrogen. Compounds suitable for use as hydrogen absorbers are known in the art and are commercially available ("Hydrogen Getters" Sandia National Laboratories, New Mexico; REB Research & Consulting, Ferndale, Mich.) The compounds can be present in the tote or can be in direct communication with the cathode of the fuel cell.

Excess hydrogen can be limited by employing mechanical means, including the use of shut off valves or flow restrictors to modulate or shut down the flow of hydrogen into the tote environment (e.g., as shown in FIG. 5). The modulation of hydrogen can be controlled by using an oxygen sensor connected to the hydrogen source such that hydrogen flow is minimized or eliminated when the level of oxygen falls below a minimum set point.

A further aspect of the invention provides for methods for transporting and storing oxidatively-degradable foodstuff. The methods utilize the packaging modules and system as described above. In a preferred embodiment, the method comprises removing the oxygen in a packaging module after insertion of an oxidatively-degradable foodstuff to generate a reduced oxygen environment within the packaging module. In addition to the oxidatively-degradable foodstuff, the packaging module comprises a pressure-stable sealable tote of limited oxygen permeability and oxygen remover. The reduced oxygen environment within the packaging module is created, for example, by flushing the environment within the tote via application of a vacuum and/or introduction of a low oxygen gaseous source to flush the tote. After flushing of the tote, the environment within the tote is a low oxygen environment. The tote is then sealed. The low oxygen gaseous source is preferably comprised of $CO_2$ or mixture of gases containing $CO_2$ as one of its components. In one particular embodiment, the low oxygen gaseous source is 100% $CO_2$. In another embodiment, the low oxygen gaseous source is a mixture of $CO_2$ and nitrogen or other inert gas. Examples of inert gases include, but are not limited, to argon, krypton, helium, nitric oxide, nitrous oxide, and xenon. The identity of the low oxygen gaseous source can be varied as suitable for the foodstuff. For example, the low oxygen gaseous source used for transport and storage of salmon is preferably 100% $CO_2$. Other fish, such as tilapia are preferably stored or shipped using 60% $CO_2$ and 40% nitrogen as the low oxygen gaseous source.

The oxygen remover in the packaging module is operated during the transport and/or storage as long as oxygen is present such that the oxygen level remains below a level that would result in a reduction of freshness or spoilage of the material. This reduced level of oxygen is maintained by the oxygen remover for either a portion but preferably for the duration of the transport and/or storage. The level of oxygen in the reduced oxygen environment is less than 1% oxygen, more preferably less than 0.1%, most preferably less than 0.01% oxygen.

In certain embodiments, after a period of time, the oxygen levels present in the packaging module remain at a reduced level where the oxygen permeability of the tote is sufficiently low that the level of oxygen arising from gaseous exchange between the foodstuff and the tote environment and/or through the permeability of the tote material reaches a sufficiently low level that further removal of oxygen is not required. At this point, the fuel cell will cease operating. Optionally, the fuel cell can be programmed to cease operation after an initial period time that is sufficient to allow a natural minimization or cessation of gaseous exchange.

While not necessarily preferred, the fuel cell can be programmed to cease operation after a period of between around 0.5 and 50 hours, or the fuel cell can be programmed to cease operation after a period of between around 1 and 25 hours; or the fuel cell can be programmed to cease operation after a period of between around 2 and 15 hours; or the fuel cell can be programmed to cease operation after a period of between around 3 and 10 hours.

Alternatively, the fuel cell can be programmed to cease operation when the oxygen level reaches and is maintained below a predetermined level. In one embodiment, the oxygen level reaches and is maintained below 5% oxygen v/v, or alternatively, the oxygen level reaches and is maintained below 1% oxygen v/v, or alternatively, the oxygen level reaches and is maintained below 0.1% oxygen v/v.

In embodiments where the fuel cell is present in a module that is external to the totes, the module can be removed after an initial period of time that is sufficient to allow a natural minimization or cessation of gaseous exchange or when the oxygen level reaches and is maintained below a predetermined level according to the parameters discussed above. Any external source of gas used to maintain the positive pressure within the tote can be removed as well after the gaseous exchange between the foodstuff and the tote environment reaches a natural minimization or cessation because the need compensate for a change in pressure within the tote is minimized.

In a preferred embodiment, the method relates to the system for transporting or storing oxidatively-degradable material as described above. Thus, in a preferred embodiment, the method comprises transporting or storing one or more of the packaging modules in a single freight container. In this embodiment, the individual packaging modules or totes are separately removable from the system. This feature allows for the delivery of individual packaging modules, or the totes of the packaging modules, without disturbing the integrity of the packaging modules or totes remaining in the system.

The packaging modules and/or the system is then used to transport or store the oxidatively-degradable material for an extended time period. Preferably, the extended time period is from between 1 and 100 days; more preferably the extended time period is from between 5 and 50 days, even more preferably the extended time period is from between 15 and 45 days.

In one embodiment, a material such as activated carbon, metals such as silver and copper and the like, can be employed either adjacent to or in the fuel cell to scavenge any by-products of the fuel cell such as hydrogen peroxide, fluorine, etc. It is understood, of course, that such absorbent materials will also scavenge other gaseous products, etc. from the food stuff in the tote that may contaminate the fuel cell.

The systems and methods described herein allow for the oxidatively-degradable material to be transported or stored for a prolonged period of time not possible using standard MAP technology or other standard food storage methods. The prolonged period will vary according to the nature of the oxidatively-degradable material. For purposes of example, fresh salmon can be stored or transported in a preserved manner for a prolonged period of at least 30 days when using the system described herein. In contrast, fresh salmon can only be stored or transported in a preserved manner for a period of from between 10-20 days in the absence of a reduced oxygen environment (See the Example).

DESCRIPTION OF SPECIFIC EMBODIMENTS

The following description sets forth a specific embodiment that can be used in the present invention. The specific embodiment is but one of the possible configurations and uses of the present invention and should not be construed in any manner as a limitation of the invention.

The present invention is particularly suited for the transport and storage of fish, such as salmon. In particular, the invention allows farmed Chilean salmon to be shipped via shipping freighter to destinations in the United States. The length of this transport (approximately 30 days) requires the use of the present invention to preserve the freshness of the salmon. Traditionally, Chilean salmon must be shipped via air freight in order to reach destinations in the United States before the salmon would spoil.

The salmon is prepackaged in cases as shown in FIG. 1. Each case, 102 contains about 38.5 pounds of salmon. Sixty four of these cases are placed into one tote, 100. Tote 100 is sized at approximately 48"×46"×100" and is made of a poly/Nylon blend material. The tote is oversized by about 35% to allow for $CO_2$ (and oxygen) absorption. The tote has one presealed end (not shown) and one sealable end 106. The tote is placed presealed end down on a pallet (not shown). The pallet is preferably covered with a protective sheet (not shown) to protect the tote and provide stability to the tote. Fifty four cases of the salmon are stacked in the tote.

Another box, ideally with the same dimension as a salmon case is added to the tote. This box contains multiple hydrogen fuel cells and hydrogen 104. In one embodiment, the hydrogen is provided by a bladder that contains pure hydrogen. The bladder is configured to be in direct communication with the anodes of the fuel cells to allow the hydrogen fuel cells to convert any oxygen present in the tote into water for the duration of the transport and/or storage. In another embodiment, the hydrogen is provided internally from an external source such as a hydrogen cylinder with compressed hydrogen gas.

The box also contains a fan (not shown) to circulate the air within the tote thus facilitating contact between the oxygen remover and the oxygen in the tote environment. The fan is powered from the energy created when the fuel cells convert oxygen to water.

Furthermore, the box contains a temperature recorder (not shown) so that a record of temperature changes can be made for the duration of the transport and/or storage. Similarly, the box contains an oxygen level recorder (not shown) so that a record of oxygen levels can be made for the duration of the transport and/or storage. The box also contains indicators (not shown) that provides a warning as to when the oxygen levels within the tote exceeds a specified maximum level or the temperature reaches or surpasses a specified maximum level. In this specific embodiment, the indicator would warn if the oxygen level exceeded 0.1% oxygen and if the temperature exceeds 38° F.

The salmon cases and the box are then unitized (cornered and strapped) and the tote is pulled up around all four sides of the unitized stack with the open end of the tote gathered into a heat sealer. A gas flush of up to 100% carbon dioxide is performed until the residual oxygen is less than about 5% v/v, and preferably less than about 1% v/v. After the environment in the tote has been so modified, a heat seal cycle is initiated and the tote is sealed at seal point 106, forming the packaging module. The fuel cell and hydrogen 104 operate for the duration of the transport and storage to remove any oxygen introduced into the packaging module by diffusion through the tote material or at the seal of the tote. Small amounts of oxygen may also be released by fish or packaging materials within the packaging module. The type of fuel cell used is a PEM fuel cell that does not require any external power source in order to convert the oxygen and hydrogen into water. See FIG. 3.

Figure 3:
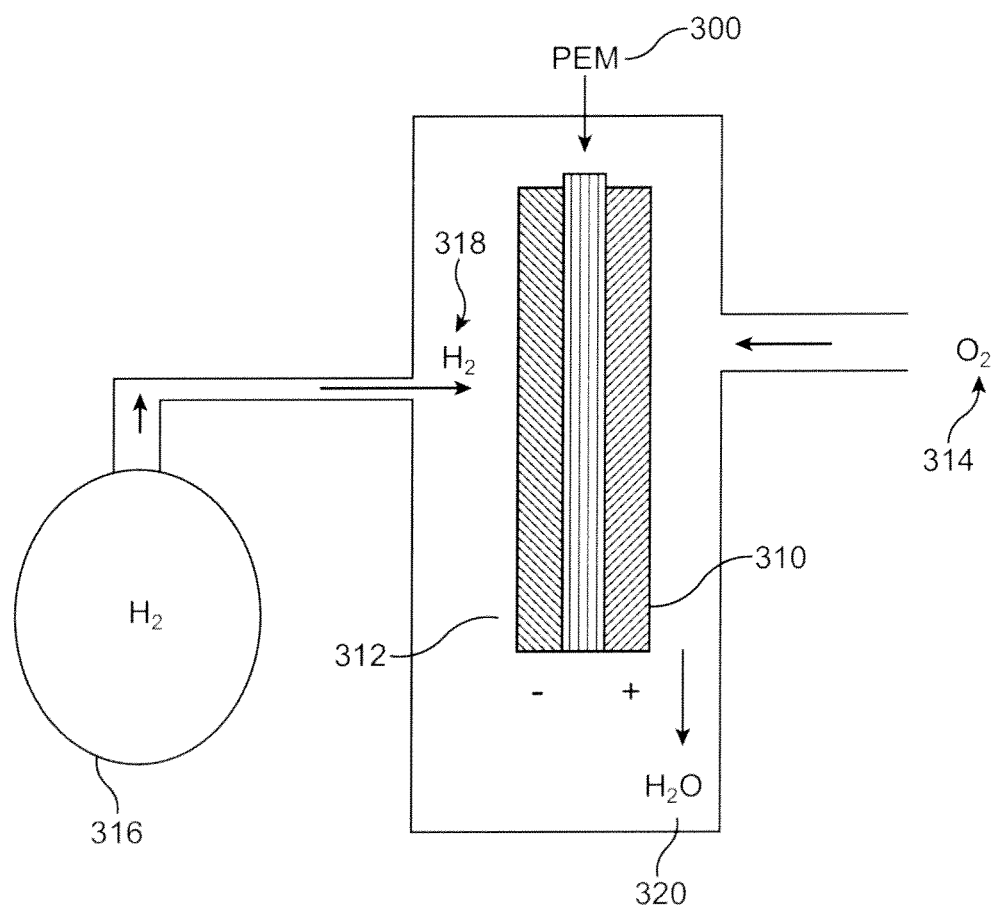
FIG. 3 is a schematic of a fuel cell embodiment of the oxygen remover.

In FIG. 3, fuel cell 300 comprises a cathode 310 and an anode 312. Fuel cell 300 is in gaseous communication with the tote atmosphere (not shown) such as oxygen 314 is in gaseous communication with the cathode 310. A hydrogen source 316, either internal or external to the tote (not shown), is in gaseous communication with the anode 312 thereby providing hydrogen 318 to the anode surface. The fuel cell converts oxygen 314 and hydrogen 318 into water 320 thereby removing oxygen from the tote's atmosphere.

Figure 2:
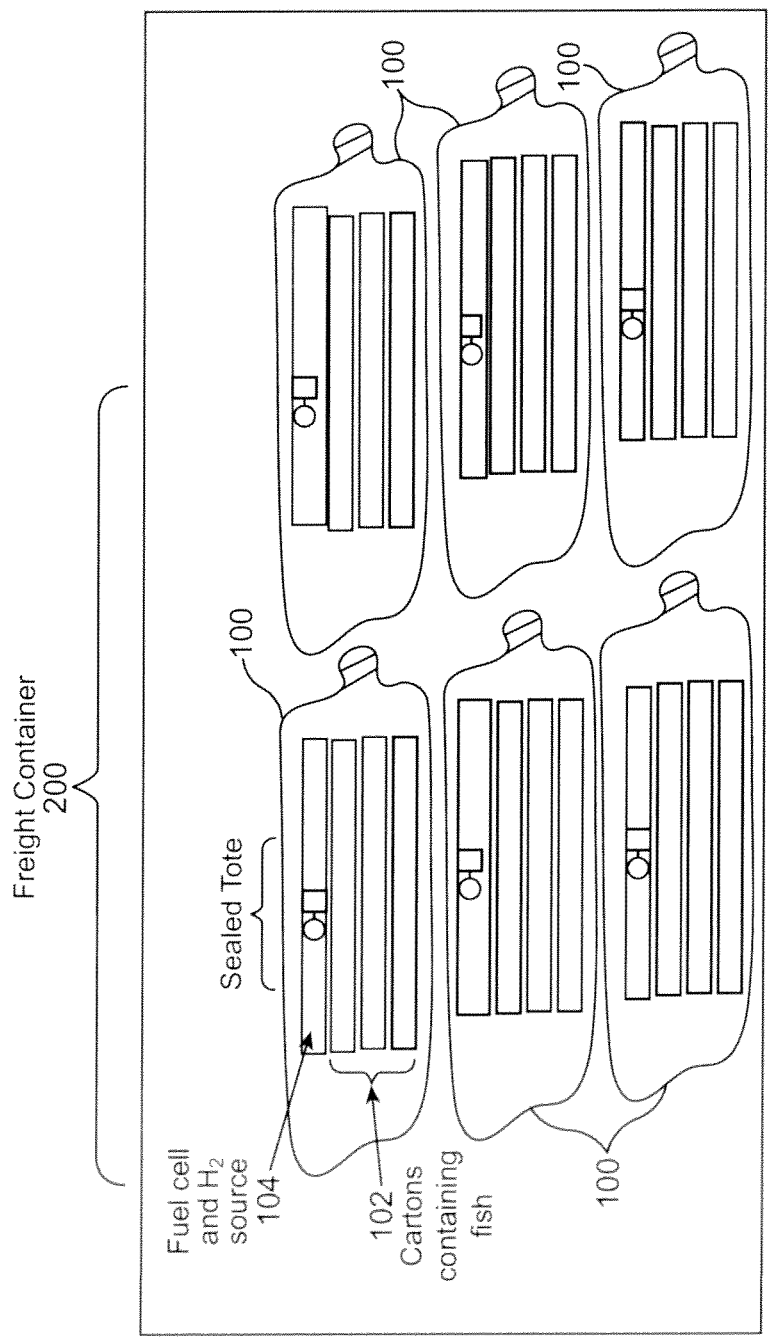
FIG. 2 is a schematic of a system comprising a plurality of the packaging modules in a container.

The packaging module is loaded into a refrigerated shipping freighter along with additional packaging modules configured as described. FIG. 2 illustrates a portion of the freight in the freight container 200 wherein multiple packaging modules 100 are stacked on each other with each module containing fuel cell/hydrogen 104 and cartons of fish 102. This system of packaging modules is loaded onto a refrigerated ocean shipping freighter. The shipping freighter transports the salmon from Chile to the United States. After reaching the first destination in the United States, a certain number of the packaging module are removed from the shipping freighter. Because in this embodiment each of the totes contains fuel cells to remove oxygen, the packaging modules remaining on the freighter can be transported to other destinations, via the ocean shipping freighter or by secondary land or air shipping freighters, under reduced oxygen conditions.

FIG. 5 provides another example of a box containing two hydrogen fuel cells, an external hydrogen source, a carbon dioxide scrubber and a volatile scrubber such as activated carbon. Specifically, in FIG. 5, box 510 contains an external hydrogen source 512 for providing hydrogen internally to the fuel cell 520 through an inlet 530 which is in gaseous communication with the fuel cell 520. The hydrogen source is piped to restrictor valve 514 and hydrogen shutoff valve 516 to control the amount of hydrogen in the fuel cell and to avoid excess hydrogen as defined above. The hydrogen shutoff valve 516 is optionally pulsed according to the vacuum level within box 510. A vacuum sensor 518 can be used to control the hydrogen shutoff valve.

Fuel cell 520 comprises an anode and a cathode with hydrated lime 522 in communication therewith so as to absorb carbon dioxide at the anode surface. Fans 524 operating to blow air through the fuel cell 520 and the hydrated lime 522 operate immediately outside of the anode and the cathode. Volatile scrubber such as activated carbon packets, 526 are placed upstream of the fans 524 to remove any by-products arising from operation of fuel cell (or by-products arising from the oxidatively labile material) 520. Box 510 is in gaseous communication with one or more totes (not shown) or is internal to a tote and in gaseous communication therewith.

FIG. 6 provides an example of a packaging module per this invention wherein the hydrogen source and fuel cell are internal to the module. Specifically, packaging module 600 contains cartons of fish 650 as well as a fuel cell 610. The fuel cell has a cathode 612, an anode 614, end plates 611, a resistor load 613, and a PEM divider 615. An internal hydrogen source 616, which is contained in a holding element 640, is provided in gaseous communication with the anode 614 through a hydrogen port 618 and a hydrogen shut-off valve 620 all made of vinyl tubing 619. Hydrated lime filter cartridge 622 removes $CO_2$ from the hydrogen in gaseous communication with the anode 614. Excess hydrogen, as defined above, can be purged through hydrogen release plumbing 626 also employing a hydrated lime filter cartridge 622. Shut-off valve 628 further regulates the release of excess hydrogen which can be released from the fuel cell at purge port 630. Port 630 can optionally be connected to a hydrogen absorber (not shown) so as to avoid exposure of the excess hydrogen with the cartons of fish 650.

The packaging module contains a $CO_2/N_2$ atmosphere 632. A fan 634 facilitates the gaseous communication of atmosphere 632 with the cathode 612 so that oxygen in the environment is converted to water by the fuel cell 610. A hydrated lime filter cartridge is employed to assist in the removal of carbon dioxide from contact with the anode 614.

EXAMPLE

Two bench top rigid containers were constructed, one with and one without a fuel cell. Two nine-liter plastic food storage containers with sealable lids were modified so that gases could be flushed and continuously introduced (at very low pressure) into each container. A commercially available fuel cell (hydro-Genius™ Dismantable Fuel Cell Extension Kit, purchased through The Fuel Cell Store) was installed into the lid of one nine liter rigid container such that hydrogen could also be introduced from the outside of the rigid container directly into the (dead ended) anode side of the fuel cell. The cathode side of the fuel cell was fitted with a convection flow plate allowing for container gases to freely access the fuel cell cathode. Sodium borohydride was purchased from the Fuel Cell Store as a chemical source of hydrogen gas (when mixed with water). A sodium borohydride ($NaBH_4$) reactor was constructed from two plastic bottles such that hydrostatic pressure could be applied for constantly pushing the hydrogen into the fuel cell and adjusting for excess hydrogen production and consumption. This allowed unattended hydrogen production and introduction into the fuel cell for extended periods (days).

Carbon dioxide cylinders (gas), regulators, valves and tubing were purchased along with a large home refrigerator. The refrigerator was plumbed to allow for external carbon dioxide to be continuously introduced into the rigid containers and hydrogen to the fuel cell.

The bench top system was tested by flushing the initial oxygen level down to near 1% with $CO_2$, closing off the outflow valves leaving the inflow valves opened, maintaining both containers under a very low constant pressure of $CO_2$. The oxygen and $CO_2$ concentrations were measured over time using a (Dansensor) $CO_2$/Oxygen analyzer while the fuel cell consumed the remaining oxygen from the one container. It was determined that the container with fuel cell was capable of maintaining oxygen levels below 0.1% while the container without a fuel cell was unable to hold oxygen levels below 0.3%.

On Day 1, Fresh Chilean Atlantic Salmon filets were purchased directly from a local (Sand City, Calif.) retail store. The salmon was taken from a Styrofoam container with a label that indicated that the (loins without fat) were packed in Chile six days previously. The retail outlet personnel placed 6 fillets (2 each) into retail display trays, stretch wrapped, weighed and labeled each of the three trays.

These three packages were transported on ice to the lab where each tray was cut in half so that half of each package could be directly compared to the other half in a different treatment. The package halves were placed into three treatment groups; 1.) Air Control, 2.) 100% $CO_2$. No Fuel Cell oxygen remover, 3) 100% $CO_2$ with Fuel Cell oxygen remover. All three treatments were stored in the same refrigerator at 36 degrees F. for the duration of the experiment. Oxygen and $CO_2$ levels were monitored daily and sensory evaluations were conducted as described below. After initial removal of oxygen, the oxygen levels remained at a level undetectable by the instrumentation. The results are shown in Table 2.

TABLE 2

| Day | Fuel Cell- $O_2$ level | No Fuel Cell- $O_2$ level |
|---|---|---|
| 0 | 0.0 | 0.0 |
| 1 | 0.0 | 0.5 |
| 2 | 0.0 | 0.7 |
| 3 | 0.0 | 0.7 |
| 4 | 0.0 | 0.8 |
| 5 | 0.0 | 0.8 |
| 6 | 0.0 | 0.8 |
| 7 | 0.0 | 0.8 |
| 8 | 0.0 | 0.7 |
| 9 | 0.0 | 0.7 |
| 10 | 0.0 | 0.7 |
| 11 | | |
| 14 | 0.0 | 0.6 |
| 15 | | |
| 16 | 0.0 | 0.5 |
| 17 | | |
| 18 | | |
| 19 | 0.0 | 0.4 |
| 20 | | |
| 22 | 0.0 | 0.3 |

Figure 4:
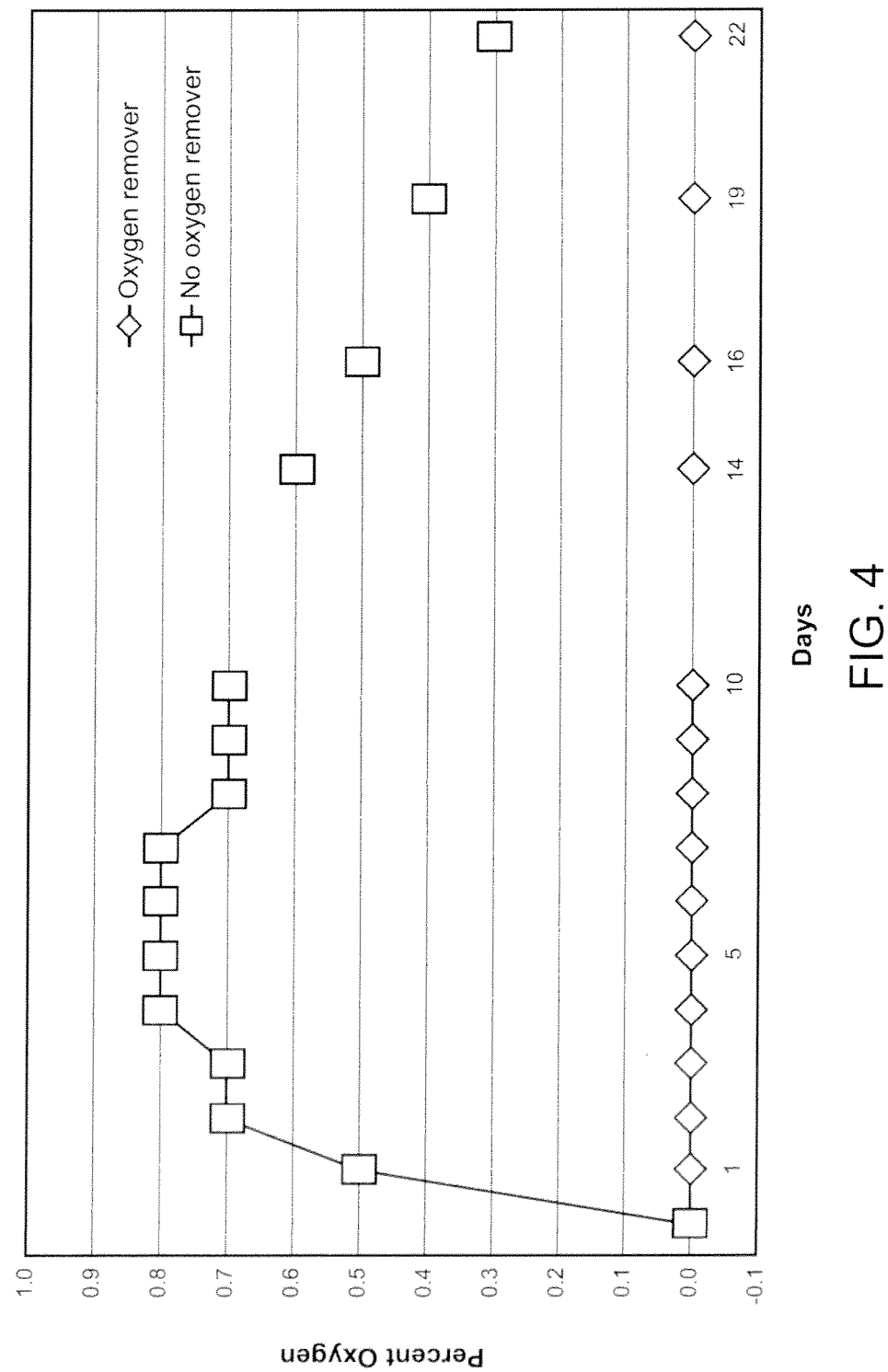
FIG. 4 is a graph showing the increased duration of low oxygen levels using the packaging module as compared to a standard MAP system.

The levels of oxygen for the duration of the experiment are shown graphically in FIG. 4.

Sensory Evaluations:

Seven days after placing the three treatments in the refrigerator, the air controls were judged marginally spoiled by odor and unacceptably spoiled on the 8th day at 36° F. This established a total shelf life of approximately 13 days from production for the air control fillets and 7 days at 36° F. (after the first 6 days at unknown temperatures).

After 22 days in the high $CO_2$ environment (plus 6 days before the test began) fillets from the fuel cell and non-fuel cell treatments were removed from the containers and evaluated by 4 sensory panelists. The evaluation scale was 5=Freshest, 4=Fresh, 3=Slightly Not Fresh, 2=Not Fresh, 1=Unacceptable. The raw sensory results are shown in Table 3.

TABLE 3

| | Day 6 + 22 | | | | | | | | |
|---|---|---|---|---|---|---|---|---|---|
| TREATMENT- SAMPLE | Fresh Odor | Off Odor Rancid | Flesh Color (pink-orange) | Sheen Clarity | Fat Color | Fat Odor | Firmness | Moistness | Slimy |
| Fuel Cell- | | | | | | | | | |
| Mean Evaluation | 4.3 | 4.5 | 4.8 | 3.8 | 3.8 | 3.7 | 4.0 | 4.0 | 4.7 |
| No Fuel Cell | | | | | | | | | |
| Mean Evaluation | 2.9 | 3.1 | 2.8 | 2.5 | 3.0 | 3.3 | 4.0 | 4.0 | 4.7 |

After an additional 6 days of storage in air at 36° F., the remaining samples were photographed raw and the "No Fuel Cell" samples were deemed inedible due primarily to rancid off odors (not microbial spoilage) and a very yellowish flesh color. The "Fuel Cell" samples were rated fresh (4) in raw color and odor. These samples were then cooked and evaluated by the 4 panelists for flavor and texture and rated Fresh (4) in both attributes.

In summary, the "Fuel Cell" samples were still rated fresh after a total of 34 days of fresh shelf life while the "No Fuel Cell" samples were unacceptable.

What is claimed is:

1. A device for storing or transporting oxidatively degradable foodstuff, comprising:
   a fuel cell;
   a hydrogen source; and
   a first means for storing or transporting the oxidatively degradable foodstuff while operating the fuel cell such that oxygen from the inside of the first means is provided to an inlet of a cathode of the fuel cell and is converted to water by the fuel cell using hydrogen provided to the fuel cell from the hydrogen source, wherein the fuel cell is located inside the first means which comprises a tote.

2. The device of claim 1, further comprising a seal which is configured to seal the first means to maintain a reduced oxygen environment within the first means.

3. The device of claim 1, wherein the first means comprises a refrigerator.

4. The device of claim 1, further comprising a means for removing carbon dioxide from the first means.

* * * * *